March 4, 1930. G. A. LOWRY 1,749,540
MACHINE FOR OBTAINING THE FIBERS FROM FIBROUS PLANTS
Filed July 18, 1925 2 Sheets-Sheet 1
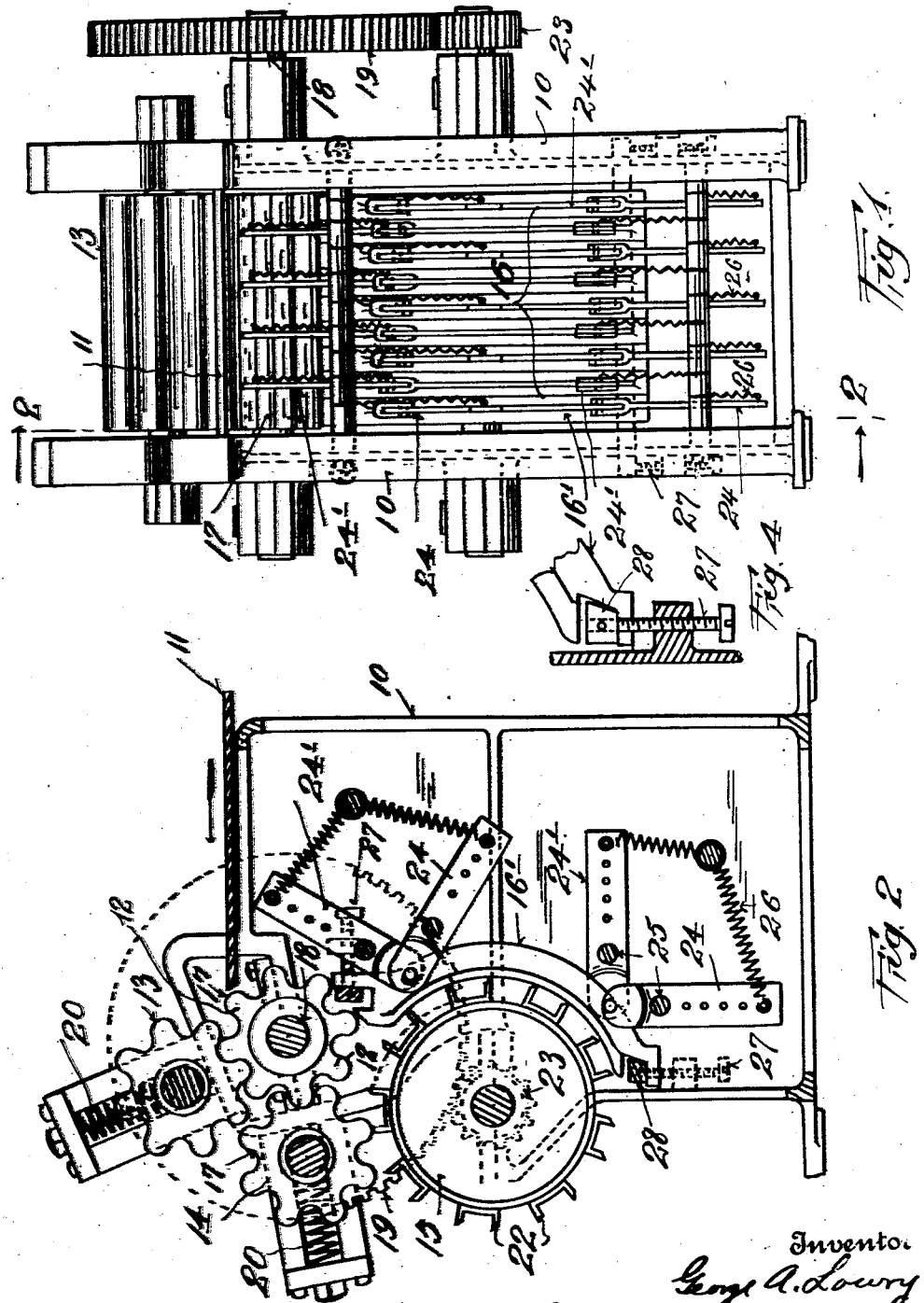

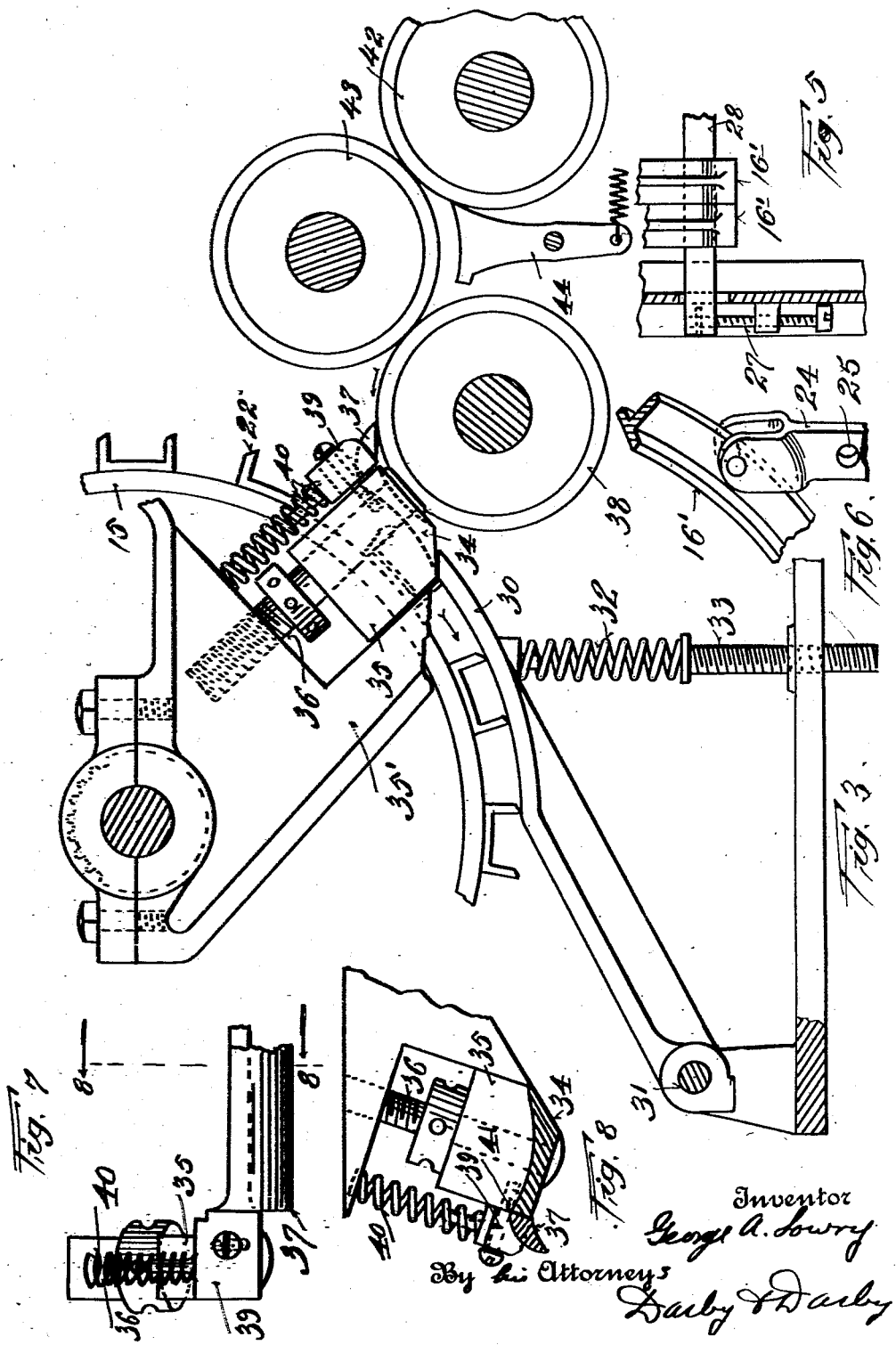

Patented Mar. 4, 1930

1,749,540

UNITED STATES PATENT OFFICE

GEORGE A. LOWRY, OF NEW YORK, N. Y., ASSIGNOR TO FABRICORD, INC., OF NEW YORK, N. Y., A CORPORATION OF NEW YORK

MACHINE FOR OBTAINING THE FIBERS FROM FIBROUS PLANTS

Application filed July 18, 1925. Serial No. 44,496.

This invention relates to machines for obtaining the fibers from fibrous leaves and from the plant stalks or stems of fiber containing plants.

The object of my invention includes the production of a machine which is comparatively simple in construction, efficient in operation, and whereby the fibers of fibrous leaves, plants, stalks and the like are freed from the non-fibrous constituents in a rapid and efficient manner without injury to the fiber and whereby the fibers are prepared for use in the manufacture of various articles of commerce.

Another object includes the production of a plant handling and fiber cleaning machine which will effectively clean all the parts of the plant leaf or plant stalk thoroughly and uniformly, even though of unequal thickness in cross-section or of variation in the fiber content of the leaf or plant stalk. A still further object includes means for subjecting uniformly all parts of the fiber containing leaf or stalk to active cleaning action for thorough and efficient cleaning, but without injury to the fiber.

Other objects will appear hereinafter and I obtain these objects by the construction illustrated in the accompanying drawings in which Fig. 1 is a view in elevation of a construction which embodies the principles of my invention.

Fig. 2 is a view taken on the line 2—2 of Fig. 1.

Fig. 3 is a view of a portion of my improved machine showing a slightly differing arrangement for feeding and cleaning the leaf or plant product.

Fig. 4 is an enlarged view showing the lower adjustment of my floating fingers.

Fig. 5 is a front view of the floating finger adjustment.

Fig. 6 is a view showing a portion of a floating finger and its spring supporting member.

Fig. 7 is a front view of the finger adjusting device employed in the construction shown in Fig. 3, and Fig. 8 is a view on the line 8—8 of Fig. 7.

Like numerals refer to similar parts throughout the several views.

In obtaining the useful fibers from the leaves, stems, stalks and other portions of fibrous plants, trees, or other growths, it has heretofore been a common practise to ret the material by treating it in fermenting and chemical solutions in order to remove the gums and other adhesive substances which form binders to bind the useful fibers to or within the non-fibrous portions of the plants, stems, stalks or the like. After the retting operation, the material is dried and then subjected to the action of breakers usually in the form of fluted or grooved rolls, between which the material is passed, and such material is then subjected to the action of decorticating devices. It has also been proposed to employ shredding devices designed to cut or shred the leaves, stems, stalks or the like, in the direction of their lengths, either before or after subjecting them to the action of crushing rolls. All such expedients have been found objectionable in various respects. The retting process requires the use of strong fermenting liquors which are difficult and dangerous to handle, and, moreover requires many days to accomplish its work. Shredding machines cause the fibers to be cut or broken resulting in the production of a very great amount of tow or waste which is unprofitable.

It is known that certain tropical fibers have been cleaned by hand, and while this method gives excellent results, it is not adapted for quantity production. The use of machinery for obtaining sisal fiber is also known, but so far as I am aware, machinery has heretofore never been successfully employed for obtaining the valuable fibers from other and perhaps more plentifully available material, of, for example, the Bromelia family, as pita, penguin, pinuela, maya, chivichivi, and the like as well as from other materials, as abaca (manila hemp), Sanseviera-banana and plantain trees (*Musa textilis*), pineapple and the like, which in many instances possess a finer and more valuable fiber than do the leaves of the sisal producing plant.

It has been found by practical experience that by reason of the variations in thickness in transverse section of various valuable fiber carrying leaves, plants, stems, stalks or the like, difficulty is encountered in securing a practical, successful and uniform action of mechanism employed for removing the pulp or other non-fibrous portions thereof without injury to the fibers contained or embodied therein. It is among the special purposes of my present invention to avoid the objections above noted, and others, and to provide a machine of simple structure whereby the material to be treated is acted upon mechanically to remove the pulp, gummy substance and other non-fibrous portions of the material, and to remove the same in a manner which permits the more or less complete separation of the valuable fibers from such non-fibrous portions, gums or the like, and without breaking, severing or injuring the fibers, and hence so as to obtain the fibers in condition for use in the industries, and without loss through the production of waste or tow.

In carrying out my present invention, I propose to employ what I call crushing, breaking and scraping devices, the material being submitted first to the action of the crushing devices, and then to the action of the scraping devices, or to breaking and scraping operation. For this purpose I have found it practical and desirable to run the material to be treated between crushing rolls which are maintained under a suitable crushing tension whereby the pulp or other non-fibrous portions of the material, are crushed and reduced to a condition which enables the scraping devices, to which the crushed material is subjected, to scrape and remove the pulp, gummy and other non-fibrous portions of the material, leaving the fiber free, or comparatively free, from adhering particles of the pulp, gummy or other non-fibrous portions of the material, and without injury to the fiber, or the production of waste in the form of tow.

As a specific embodiment of my invention in a fiber extracting and cleaning machine I provide a plurality of coarsely fluted rollers which are preferably geared so as to act in unison. Preferably though not necessarily, I provide three such co-acting rollers. These rollers are tensioned towards each other for proper action on the plant leaf, or plant part, that is fed into the machine and between the crushing rollers. After crushing the leaves or the plant parts, they are subjected to special breaking actions to better loosen the fiber. Simultaneously therewith or immediately thereafter the material is delivered to the scraping drum, which is provided with means for uniformly acting on all parts of the leaf or plant, so as to properly, thoroughly and uniformly scrape all parts of the leaf, including the thicker mid-rib portion and the thinner marginal parts. For treating heavy, long leaves, which are considerably thicker at their median portion than at their marginal edges, I provide flexible and adjustable leaf-holding and guiding members whereby all parts of the leaves or plants are subjected to uniform scraping action, regardless of their sectional dimensions.

In my present construction to which I do not however, desire to be restricted excepting as defined in the appended claims, I provide a frame 10, for supporting a feed table 11. The frame 10 also supports the feed or crushing devices in the form of rollers 12, 13, and 14, the scraper drum 15, and the flexible and adjustable holder and guide 16, together with the co-acting parts, which are described more fully below.

The feed table 11 provides means for holding and guiding the plant material (not shown) to the crushing devices or rollers 12, 13 and 14. These rollers are provided with rounded intermeshing flutings 17. Roll 12 is supported on and is driven from a drive shaft 18 to which is connected a drive gear 19. Rolls 13 and 14 are adjustably held against roll 12 by adjustable springs 20 and the fluting of these rolls intermesh with those of roll 12 to be thus driven and to effectively crush and remove some of the non-fibrous material. By reason of the relative positions of these rolls the fiber containing leaf or plant is subjected to a sharp breaking in the change of its path of travel, to thereby better loosen the fiber. This breaking action is given to the material in addition to the fluting and crushing actions of the fluted rollers.

The crushed leaf or fiber containing material is then submitted to the scraping action of the scraping or cleaning drum. To this end I provide drum 15 with chisel like scraper members 22, which impinge on the crushed leaf or plant portion to free the same from any remaining pulpy or gummy mass and other non-fibrous material. The scraper drum is driven from a drive gear 23 at a high speed. In order to thoroughly and effectively clean every portion of the crushed leaf or plant I provide means whereby the different sections of the leaf and plant guide and holder 16 are independently flexible and the guide member itself is composed of a plurality of floating or adjusting fingers or sections in the shape of a flexible adjustable platform or apron. The floating fingers 16′ are curved to coincide with the arc described by the scraper blades, and these fingers are flexibly held by the spring tensioned levers 24, 24′ etc. (a pair for each finger) to press the material against the scraper blades 22 without coming into contact with the blades. In the particular construction shown there are nine floating fingers and each finger is provided with a pair of tensioning levers as is best shown on Figs. 1 and 2. The levers 24 (or 24′ etc.) are pivotally mounted at 25 and are tensioned by springs 26 to thus constantly urge each finger towards the scraper blades. To limit the forward movement of the fingers I provide adjusting devices at each end of the fingers. These devices consist of a set-screw 27 for adjustably holding an adjustment bar 28 against which the finger is pressed by the spring pressed levers and thus providing for proper scraping tension on the material for the different thicknesses of the leaf or plant.

In the construction disclosed by Figs. 3, 7 and 8 I have shown a slightly different arrangement. In this form I provide a specific adjustment for keeping the flexible fingers 30, preferably spaced for the scraper blades. For this purpose the fingers are pivotally mounted on a pivot bar 31, and are urged towards the scraper blades 22 of the scraper drum 15 by a spring 32 which is adjustably supported by the screw-threaded bar 33. The adjustable or upper ends of the fingers 30 are bevelled to engage a corresponding portion of each of the adjustment bar 34 which is adjustably held by the frame blocks 35 and the adjusting screws 36 at the outer ends of the bar 34 in frame 35'. This bar is properly spaced to admit the crushed leaf or plant fiber to be exposed to the first contact of the scraper blades. A flexible scraper bar 37 engages the surface of the circular roller 38 to guide the fiber into the flexible apron and into contact with the scraper blades. The scraper bar 37 is held by the end blocks 39 and is tensioned onto the roller surface by a spring 40. It will be noted that the adjustment bar 34 and the scraper bar 37 form a shoulder 41 over which the crushed leaf or plant fiber is carried to be thus broken as it is pulled over said shoulder. The leaf or fiber containing plant is fed between rollers 42 and 43 to be guided by a flexibly supported guide member 44 onto and between rollers 38 and 43. From the crushing rollers the crushed leaf or plant fiber passes over the breaking surface and onto the flexibly held fingers 30 which are properly adjusted and flexibly held for independent movement to properly press all parts of the crushed fiber mass or leaf against the scraper blades 22.

From the foregoing description it will be seen that I provide an exceedingly simple and efficient machine for obtaining useful and valuable fibers from the leaves, stalks, or other portions of various plants, trees, or the like, which is economical to construct and operate, is easily transportable and which is capable of being operated by any desired source of power, or by hand. By being transportable, the machine may be carried to the source of supply of the material, instead of bringing the material to the machine. This very materially and substantially reduces the cost of operation as it avoids long haulage of the raw material, which, in the case of many kinds of leaves and plants is heavy, especially when in green condition and full of juices. The fibers obtained in the operation of the machine may be bailed for transportation in the usual or any convenient manner. It will be observed that comparatively small power is required to operate a machine. It will also be seen that I provide an exceedingly simple and inexpensive structure of few and sturdy parts while at the same time I provide a structure which permits the ready removal and replacement of a broken part, and therefore, the cost of repairs and up-keep is reduced to a minimum.

It will also be seen that the machine is capable of operation upon various kinds and natures of material, and is not necessarily special for any particular species of fibrous stalks, plants or leaves. It will also be seen that I provide a machine which attains rapidly and economically results which for the most part have heretofore been accomplished manually and at the expense of great labor and toil, and I avoid the loss of time heretofore required in retting operations and I avoid loss and waste of material in the form of broken fibres and tow.

It is to be understood that many variations and changes in detail of construction and arrangement would readily occur to persons skilled in the art and still fall within the spirit and scope of my invention.

What I claim therefore as new and useful of my own invention and desire to secure by Letters Patent is:

1. In a machine for obtaining the fiber material from fibrous leaves and fiber bearing plants, a scraper mechanism including a scraper device and an apron cooperating therewith, said apron comprising floating fingers disposed longitudinally of the path of travel of the material, means for bodily tensioning each end of the fingers onto the scraping device and adjustable means at the ends of said fingers for limiting the movement of the fingers.

2. In a machine for obtaining the fiber from fibrous leaves and fiber bearing plants, a scraper mechanism including a scraper device and an apron cooperating therewith, said apron comprising a plurality of floating fingers, each finger being independently movable bodily towards and from the scraper device longitudinally of the path of travel of the material and means at each end of said fingers to limit the approach of said fingers towards the scraper device.

3. In a machine for obtaining the fiber from fibrous leaves and fiber containing plants, a scraper mechanism including a scraper device and an apron cooperating therewith, said apron comprising longitudinally arranged, independently and bodily movable floating fingers, means to equalize the approach of the surface of said fingers towards the scraper device and a frame for each end of the fingers.

4. In a machine for obtaining the fiber from fibrous leaves and fiber bearing plants, the combination with crushing devices operating to crush the material from which the fibers are to be obtained, of a flexible supporting surface to which the crushed material is delivered, a scraping drum disposed above and transversely across said supporting surface and cooperating therewith to remove the non-fibrous portions from the crushed material, said supporting surface made in independently yieldable floating fingers disposed to extend longitudinally in the direction of feed of the crushed material, and means at each end of said fingers to limit the approach of said fingers towards the scraper drum but permitting each finger to move and float radially.

5. In a machine for obtaining the fiber from fibrous leaves and fiber containing plants, the combination with a pair of rolls disposed in side by side relation and a third roll peripherally contacting with both of said base rolls and operating to feed and crush the material between them, an apron for manipulating said material at a breaking angle of said apron to which said crushing rolls deliver the crushed material, and a scraper drum disposed above and transversely across said apron and cooperating therewith to remove the non-fibrous portions from the crushed material, said apron comprising a plurality of parallel independently yieldable floating fingers spaced from the scraper drum, and a frame at each end of said fingers to limit the approach of said fingers towards the scraper drum.

6. In a machine for obtaining the fiber from fibrous leaves and fiber yielding plants, the combination with a pair of rolls disposed adjacent to each other, a third roll contacting with both of said rolls and operating to feed and crush the material between them, of a plurality of floating fingers arranged to receive the crushed material, said fingers disposed longitudinally to the travel of said material, a scraper drum disposed adjacent to said floating fingers and cooperating therewish to remove the non-fibrous portions from the crushed material, means for yieldingly supporting each of said fingers radially near their ends and means to limit the movement of said fingers.

In testimony whereof I have hereunto set my hand on this 17th day of July, A. D. 1925.

GEORGE A. LOWRY.